US008386299B2

(12) United States Patent
Kumble

(10) Patent No.: US 8,386,299 B2
(45) Date of Patent: Feb. 26, 2013

(54) SYSTEM AND METHOD FOR DYNAMICALLY PRICING ELECTRONIC ADVERTISEMENTS

(75) Inventor: Prashanth Nayak Kumble, Malmö (SE)

(73) Assignee: Sony Mobile Communications AB, Lund (SE)

( * ) Notice: Subject to any disclaimer, the term of this patent is extended or adjusted under 35 U.S.C. 154(b) by 358 days.

(21) Appl. No.: 12/874,271

(22) Filed: Sep. 2, 2010

(65) Prior Publication Data

US 2012/0059726 A1    Mar. 8, 2012

(51) Int. Cl.
*G06Q 10/00* (2006.01)
*G06Q 30/00* (2006.01)
(52) U.S. Cl. .................... 705/7.35; 705/14.69
(58) Field of Classification Search ................ 705/7.35, 705/14.69
See application file for complete search history.

(56) References Cited

U.S. PATENT DOCUMENTS

| 7,421,155 | B2 * | 9/2008 | King et al. | 382/312 |
| 8,196,166 | B2 * | 6/2012 | Roberts et al. | 725/34 |
| 2008/0155588 | A1 * | 6/2008 | Roberts et al. | 725/34 |
| 2008/0208692 | A1 * | 8/2008 | Garaventi et al. | 705/14 |
| 2008/0270242 | A1 * | 10/2008 | Aaltonen | 705/14 |
| 2009/0006388 | A1 * | 1/2009 | Ives et al. | 707/5 |
| 2009/0048860 | A1 * | 2/2009 | Brotman et al. | 705/1 |
| 2009/0254409 | A1 * | 10/2009 | Kozhukh | 705/10 |

OTHER PUBLICATIONS

Definitions of "comment" and "commentary", Merriam Webster Collegiate Dictionary, Tenth Ed. (Springfield, Mass., USA, 1997).*

* cited by examiner

*Primary Examiner* — Donald L. Champagne
(74) *Attorney, Agent, or Firm* — Coats & Bennett, P.L.L.C.

(57) ABSTRACT

User terminals receive multimedia content, such as on-line articles, from a publisher. The user terminals collect statistical data indicating the current popularity of the content with the users, and report the statistical data back to a server associated with the publisher. The server accumulates and periodically analyzes the statistical data and dynamically generates prices for the publisher to charge the advertisers based on this information. Placing advertisements with more popular content, as determined by the statistical data, could cost the advertisers more than placing advertisements with less popular content.

18 Claims, 7 Drawing Sheets

US 8,386,299 B2

SYSTEM AND METHOD FOR DYNAMICALLY PRICING ELECTRONIC ADVERTISEMENTS

BACKGROUND

The present invention relates generally to computing devices, and more particularly, to computing devices that provide multimedia content to one or more user terminals via an IP connection.

Traditional media content is delivered to users in non-electronic formats. For example, many people continue to receive print media, such as newspapers and magazines, from one or more publishers at their home or place of business. The publishers generally charge the readers for delivery of the content; however, this is not the only revenue source for the publisher.

Particularly, advertisers often pay the publishers a predetermined fee to have their advertisements printed in the media content for a limited amount of time. Typically, the cost an advertiser must pay the publisher for any given advertisement will vary according to the size of the advertisement and/or according to the placement of an advertisement within the media content. For example, larger advertisements (e.g., full-page or half-page ads) will generally cost the advertiser more than a much smaller advertisement (e.g., a quarter-page or eighth-page advertisement). Similarly, advertisements placed on the front or back pages of a newspaper will cost more than advertisements placed in the middle. However, one problem with these traditional pricing schemes is that the prices a publisher charges its advertisers for placing advertisements are static.

SUMMARY

The present invention provides a system and method of dynamically generating prices to charge advertisers for publishing electronic advertisements. Particularly, in one embodiment, the present invention provides a method for dynamically generating a price for an electronic advertisement that is displayed on one or more user terminals. In this embodiment, the method comprises receiving, from one or more user terminals, information identifying multimedia content being displayed on the user terminals, and statistical data indicating the current popularity of the multimedia content with the users of the user terminals. The method also comprises dynamically generating a price to charge an advertiser for publishing an electronic advertisement to the user terminals along with the multimedia content based on the current popularity of the multimedia content.

In one embodiment, the statistical data received from the one or more user terminals comprises a total time that each user spent viewing the multimedia content and/or comments associated with the multimedia content on their respective user terminal.

In one embodiment, the statistical data received from the one or more user terminals indicates whether one or more of the users electronically shared the multimedia content with other users.

The statistical data may indicate, for example, the number of other users with whom the multimedia content was electronically shared.

In one embodiment, the statistical data received from the one or more user terminals indicates whether one or more of the users posted a comment regarding the multimedia content.

In one embodiment, the method further comprises accumulating the statistical data received from the one or more user terminals in a database.

In one embodiment, dynamically generating a price to charge an advertiser comprises periodically analyzing the accumulated statistical data, and determining how popular the multimedia content currently is with a plurality of users based on the analysis of the accumulated statistical data.

In one embodiment, determining how popular the multimedia content currently is with a plurality of users comprises comparing the accumulated statistical data to one or more predetermined threshold values set by a publisher of the multimedia content.

In one embodiment, the dynamically generated price comprises a minimum bid.

In one embodiment, dynamically generating a price to charge an advertiser comprises dynamically generating the price based on the current popularity of the multimedia content and on a desired placement of the advertisement relative to the multimedia content.

In addition to the method, the present invention also provides a computing device configured to generate the pricing information for an electronic advertisement that is displayed on one or more user terminals. In one embodiment, the computing device comprises a communication interface configured to receive, from one or more user terminals, information identifying multimedia content being displayed on the user terminals, and statistical data indicating the current popularity of the multimedia content with the users of the user terminals. The device also comprises a programmable controller configured to dynamically generate a price to charge an advertiser for publishing an electronic advertisement to the user terminals along with the multimedia content based on the current popularity of the multimedia content.

In one embodiment, the statistical data received from the one or more user terminals comprises a total time that the users spent viewing the multimedia content on their respective user terminal.

In one embodiment, the statistical data received from the one or more user terminals indicates whether one or more of the users electronically shared the multimedia content with other users.

For example, the statistical data may indicate the number of other users with whom the multimedia content was shared.

In one embodiment, the statistical data received from the one or more user terminals indicates whether one or more of the users posted a comment regarding the multimedia content.

In one embodiment, the programmable controller is further configured to update a database to accumulate the statistical data received from the one or more user terminals.

In one embodiment, the programmable controller is further configured to periodically analyze the accumulated statistical data, and determine the current popularity of the multimedia content based on the analysis of the accumulated statistical data.

In one embodiment, the programmable controller is further configured to compare the accumulated statistical data to one or more predetermined threshold values set by a publisher of the multimedia content to determine the current popularity of the multimedia content.

In one embodiment, the dynamically generated price comprises a minimum bid.

In one embodiment, the programmable controller is further configured to dynamically generate the price for the advertisement based on the current popularity of the multimedia content and on a desired placement of the advertisement relative to the multimedia content.

DETAILED DESCRIPTION

The present invention provides a system and method of dynamically generating prices to charge advertisers for publishing electronic advertisements. Particularly, a publishing entity publishes the electronic advertisements along with multimedia content to a plurality of user terminals. Inevitably, some multimedia content will be more popular with users than other multimedia content. Therefore, each user terminal collects statistical data indicating the popularity of the multimedia content to its user and reports the statistical data to a server associated with the publisher. The server accumulates the statistical data received from each user terminal in a local database, and analyzes the accumulated statistical data to determine the current popularity of the published multimedia content. Then, based on the determined current popularity of the multimedia content, the server will dynamically generate a price for the publisher to charge the advertisers for publishing their advertisements along with the multimedia content. Advertisers having their advertisements published along with more popular multimedia content could pay more to the publisher than those having their advertisements published along with less popular multimedia content.

Figure 1:
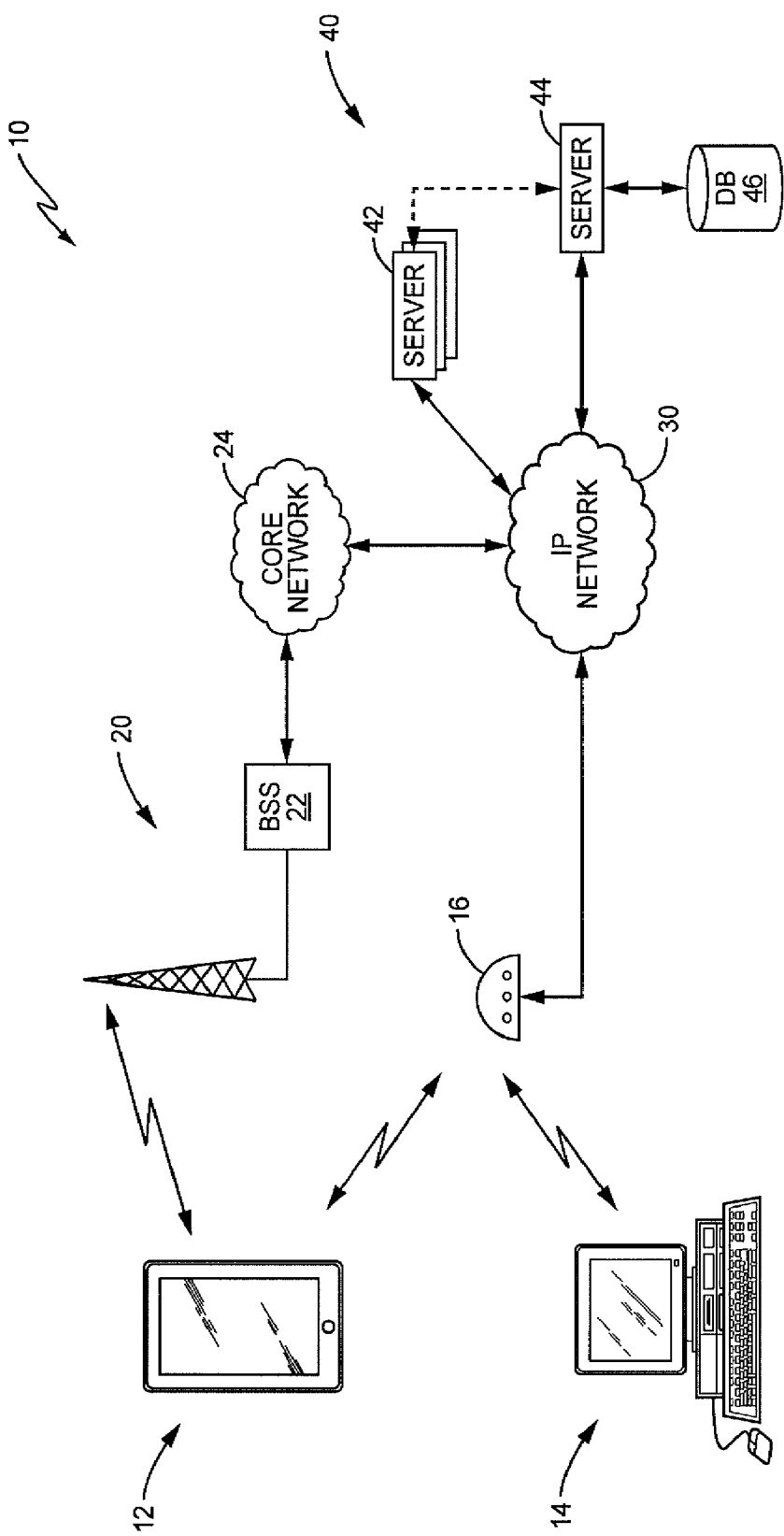
FIG. 1 is a perspective view of a communication system suitable for use in one embodiment of the present invention.

Turning now to the drawings, FIG. 1 is a perspective view illustrating a communications system 10 configured according to one embodiment of the present invention. As seen in FIG. 1, system 10 comprises one or more user terminals 12, 14. Each user terminal 12, 14 is configured to receive data packets (i.e., multimedia content) from ePublishing system 40 via one or both of a wireless communications network 20 and a publically accessible IP network 30 such as the Internet. Particularly, the ePublishing system 40 provides electronic advertisements for a variety of different products and/or services along with the multimedia content, and transmits the content to the user terminals 12, 14 for display to a user. Similarly, the user terminals 12, 14 are configured to collect different statistical data regarding the popularity of the multimedia content, and to report that data to the ePublishing system 40 via network 20 and/or Internet 30. As described in more detail later, each user terminal 12, 14 is configured to collect and report the statistical data in substantially real time thereby providing a publisher operating the ePublishing system 40 with an accurate picture of the type of content users are currently most interested in.

The user terminals 12, 14 may be any type of communication terminal known in the art. In one embodiment, shown in FIG. 1, user terminal 12 comprises a wireless device, such as an iPad®, or a Kindle®, for example, or a cellular telephone such as an Android® or iPhone®, for example, that communicates the data packets with publisher 40 via a Base Station Subsystem (BSS) 22. In these cases, user terminal 12 would include a cellular transceiver that implements any one of a variety of communication standards including, but not limited to, the standards known as the Global System for Mobile Communications (GSM), General Packet Radio Service (GPRS), Universal Mobile Telecommunication System (UMTS), TIA/EIA-136, cdmaOne (IS-95B), cdma2000, and Wideband CDMA (W-CDMA). Upon receiving data packets from the user terminal 12, the BSS 22 would communicate them to the ePublishing system 40 via a core network 24 and Internet 30. Similarly, data packets containing multimedia content sent by the ePublishing system 40 are communicated to the user terminal 12 via the Internet 30 and network 20. The communication protocols that define the messaging and interaction between the BSS 22, the CN 24, and the Internet 30 (e.g., TCP/IP) are well-known in the art and therefore, not described in detail here.

In addition to (or in lieu of) communicating with ePublishing system 40 using cellular technology, the user terminal 12 may send and receive data packets to the ePublishing system 40 via the Internet 30 utilizing any of a wide variety of short-range communication protocols. For example, a user terminal 12 configured according to one embodiment of the present invention includes a short-range transceiver operating according to a well-known short-range protocol such as Bluetooth®. As is known in the art, Bluetooth® is a universal radio interface that enables two or more wireless devices to communicate wirelessly via short-range ad hoc networks. As seen in FIG. 1, the user terminal 12 connects to the Internet 30 and publisher 40 via a corresponding wireless router 16. The wireless router 16 may be, for example, an Airport Extreme® or similar device, and also operates according to the Bluetooth® protocol.

The present invention is not limited to operating only with mobile wireless devices such as user terminal 12. In some embodiments, the present invention also operates with other types of user terminals such as a user's personal computing device. For example, user terminal 14 could be embodied as a desktop or laptop computing device that includes an Ethernet® interface for communicating via the ePublishing system 40 via an IP network. Additionally, the user terminal 14 could include a short-range transceiver. As above, the short-range transceiver would allow the user terminal 14 to communicate with the wireless router 16 via the short-range protocol, and thus, communicate data packets with the ePublishing system 40.

ePublishing systems, such as system 40 seen in FIG. 1, electronically publish a variety of multimedia content for distribution to a plurality of subscribing user terminals 12, 14 via the wireless network 20 and/or Internet 30. In accordance with the present invention, such multimedia content includes, but is not limited to, e-books, electronic articles and papers, on-line journals, on-line newspapers, on-line magazines, on-line encyclopedias, and application programs that are downloaded to/loaded on the user terminal 12 and executed on user terminal 12. In many cases, the publisher or service provider operating a given ePublishing system is an entity or company (e.g., Mygazines, Eastgate Systems, InformIT, etc.); however, in some cases, the publisher may be an individual author publishing his or her own article or book through a publishing house, such as Vanity Press. In one embodiment, the publisher is a company or individual that distributes software applications for use on the user terminal 12.

As seen in FIG. 1, the ePublishing system 40 comprises, inter alia, one or more content servers 42 that store the multimedia content to be distributed. These servers are connected to the Internet 30 to allow user terminals 12, 14 to access and download desired electronic content. The ePublishing system 40 also includes a control server 44 that allows the publisher or service provider operating the ePublishing system 40 to maintain the system 40, and a database 46 that maintains information on its subscribers.

There are many different revenue models available to publishers for publishing multimedia content; however, in one embodiment of the present invention, the publisher earns money from advertisers for including their advertisements within the multimedia content that is published to the user terminals 12, 14. With traditional pricing methods, the cost of placing an advertisement or other similar type of message is static. Thus, advertisers are conventionally charged a fixed rate to have their advertisements published to a user along with some article or other content that users may or may not find interesting. In such cases, advertising prices are influenced by the size of an advertisement, as well as on the number of subscribers at-large registered to receive the However, there is no guarantee that every subscriber who receives the multimedia content actually reads the content that appears near the advertisement. Moreover, neither the publisher nor the advertiser can accurately predict the actual readership of any given article. The present invention deviates from these conventional methods in that the present invention dynamically generates the advertising prices based on the determined current popularity of the content near which the advertisements appear.

Particularly, the control server 44 of the present invention receives statistical data from the user terminals 12, 14 regarding the current popularity of the multimedia content they receive from content servers 42. The control server 44 stores the statistical data in database 46, and periodically analyzes this statistical data to determine which multimedia content is currently most popular with users. Based on that analysis, the control server 44 dynamically generates prices for the publisher to charge the advertisers based on the current popularity of the content. This allows publishers to obtain a more accurate insight of who is viewing which content, and which content is being viewed the most.

For example, consider two different electronic articles provided by the content servers 42—a first article which is very popular with many users and a second article that is not as popular. Because the first article is more popular, it can be determined that more people (i.e., more potential customers) are reading or viewing the first article than are reading or viewing the second article. Thus, the price generated for placing an advertisement near the more popular article would be higher than the price that is generated for the second article. In other words, pricing according to the claimed invention is more closely aligned with the number of people that are actually reading or viewing the content.

This is accomplished by the present invention by determining the actual readership of the content along with how currently popular the content is with the readership. This allows a publisher to tie the advertising rates to the actual readership and to the current popularity of the content. Further, with the present invention, advertising costs can change over time with the current popularity of the content. Thus, the advertising prices for given content would increase or decrease along with the rising/falling popularity of the content.

Figure 2:
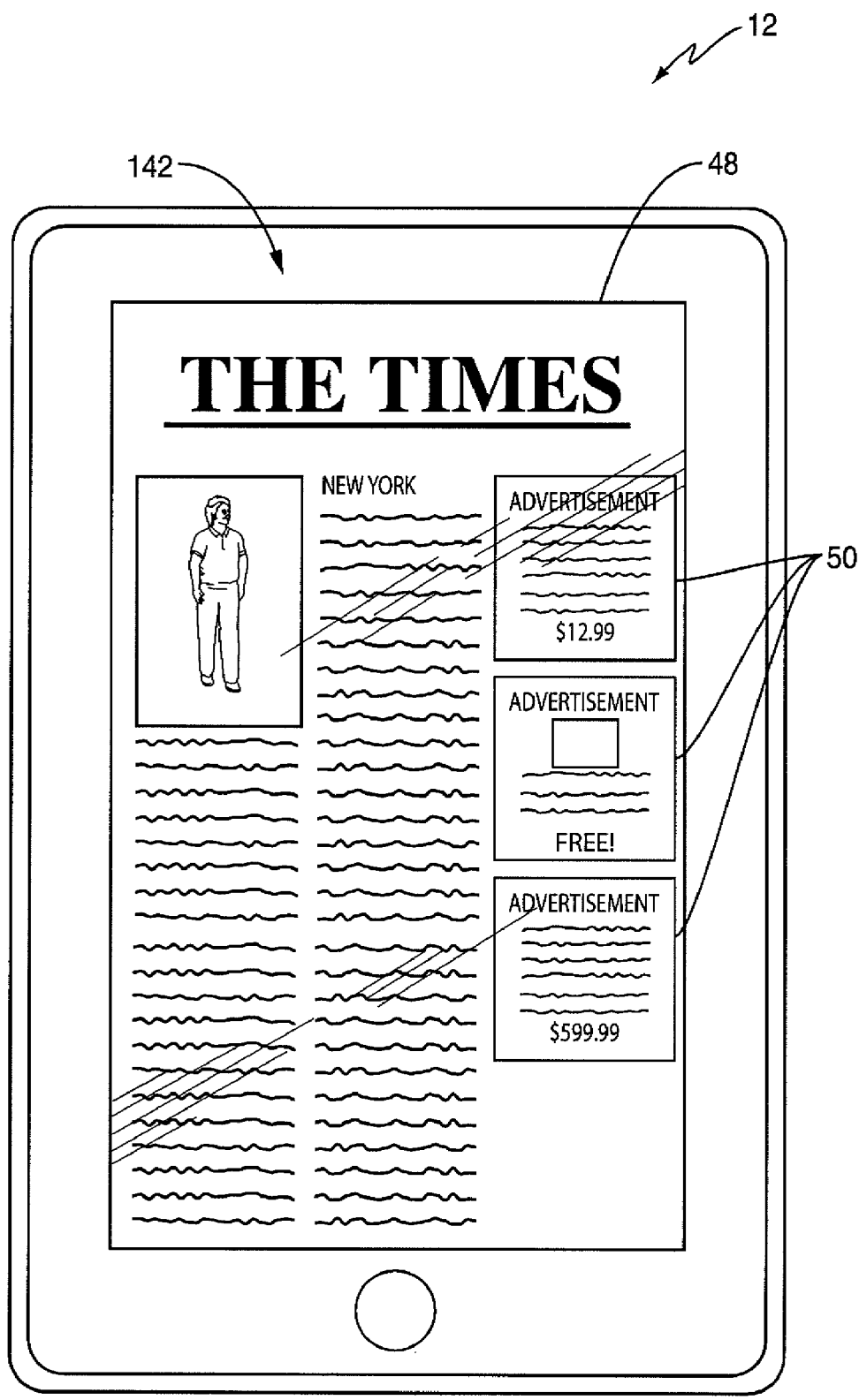
FIG. 2 is a perspective view illustrating a user terminal displaying multimedia content in conjunction with electronic advertisements that were priced according to one embodiment of the present invention.

FIG. 2 illustrates an example of a user terminal 12 displaying multimedia content 48 received from content servers 42. As seen in FIG. 2, the user terminal 12 has a user interface 142 (e.g., a touch-sensitive display) that displays multimedia content 48. In this embodiment, the multimedia content 48 comprises a newspaper article. Typically, the publisher will include one or more advertisements 50, which are displayed on the same page along with the article. According to the present invention, the costs for publishing these advertisements 50 changes along with the rising and waning popularity of the article.

Figure 3:
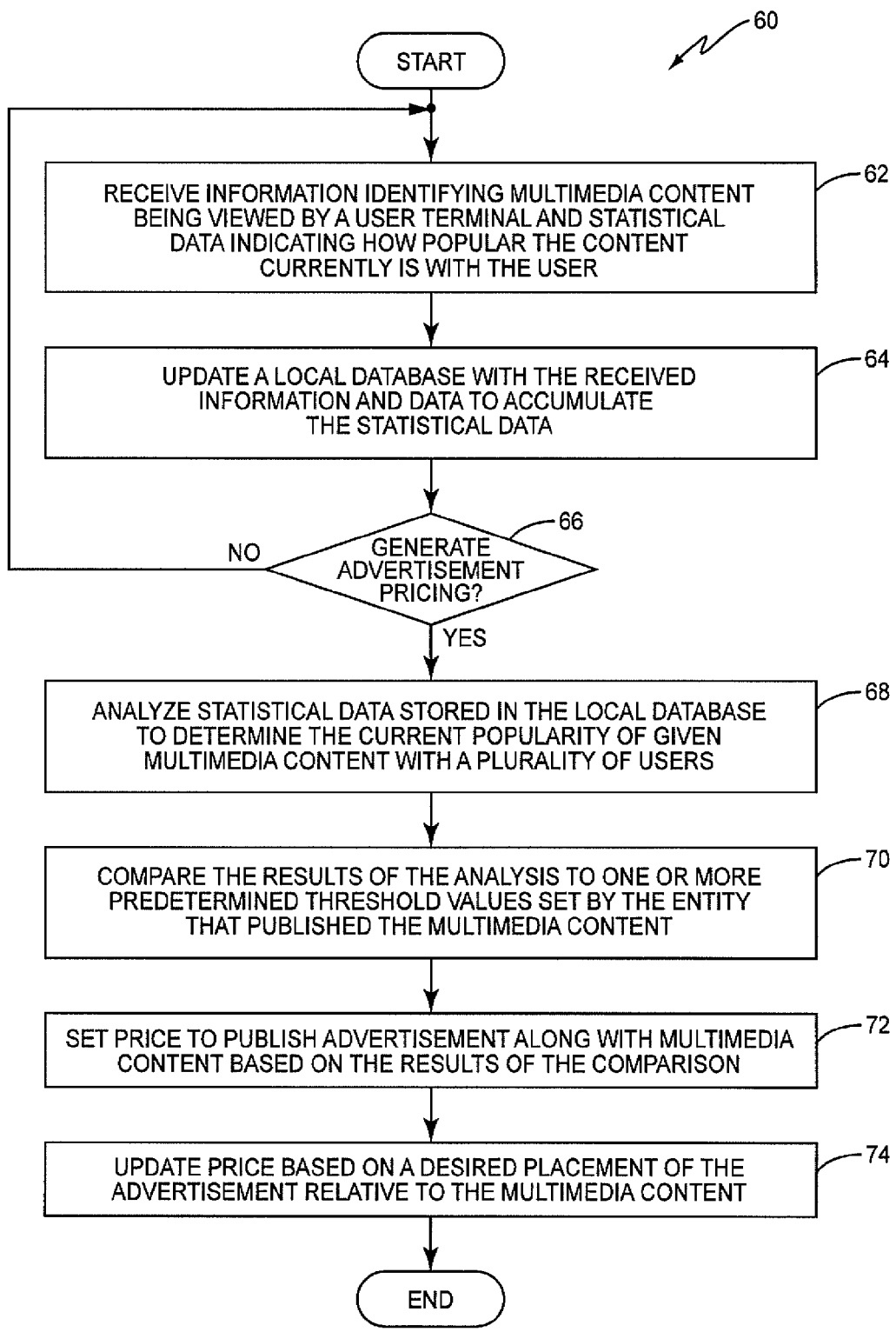
FIG. 3 is a flow diagram illustrating a method of dynamically generating prices for advertisements to be published along with multimedia content according to one embodiment of the present invention.

FIG. 3 is a flow diagram illustrating a method 60 of performing the present invention according to one embodiment. As described in FIG. 3, method 60 is performed by the control server 44 of the ePublishing system 40. However, this is for illustrative purposes only. It should be noted that the present invention is not restricted to being performed on the control server 44, but instead, may be performed on one or more of the content servers 42, one or both of the control server 44 and the content servers 44, or one or more other computing devices that are associated with the publisher.

Method 60 assumes that the user terminals 12, 14 have requested and received multimedia content from the content servers 42, and that the user terminals 12, 14 have already provided the data and information required by the control server 44 to determine the current popularity of the content. Particularly, the control server 44 receives information identifying the multimedia content being viewed by the users, as well as statistical data that indicates the current popularity of the content with the user (box 62). By way of example, the identifying information may be the title of a document, or it may comprise some other unique identifier or label assigned to the multimedia content by the publisher. The control server 44 will typically receive the statistical data from many different user terminals 12, 14. Therefore, upon receiving the statistical data, the control server 44 updates the database 46 with the received statistical data to accumulate the data (box 64). Since the received statistical data contains indicators of the actual readership and current popularity of content, control server 44 may dynamically generate advertiser prices based on an analysis of this data (box 66).

Generating the advertising prices may occur, for example, whenever a user requests multimedia content. For example, upon receiving a user request for multimedia content, the control server 44 could obtain and analyze the most current statistical data for the requested content from the database 46 to determine the current popularity of multimedia content with a plurality of users (box 68). The control server 44 could then compare the results of the analysis to one or more predetermined threshold values set by the publisher (box 70). Based on the results of the comparison, the control server 44 dynamically sets a price to charge an advertiser for publishing an advertisement along with the multimedia content (box 72). Optionally, the price can be updated according to a desired placement of the advertisement (box 74). For example, an advertiser may pay an additional cost or premium for having an advertisement published closer to a beginning of the content than if it were to appear towards the end of the content. This is especially useful for multi-page articles, or articles that a user must scroll through to read. Regardless of the particular indicators, however, the control server 44 could generate one or more control signals to cause one or more of the content servers 42 to include the advertisement along with the content before publishing the content to the user.

Figure 4:
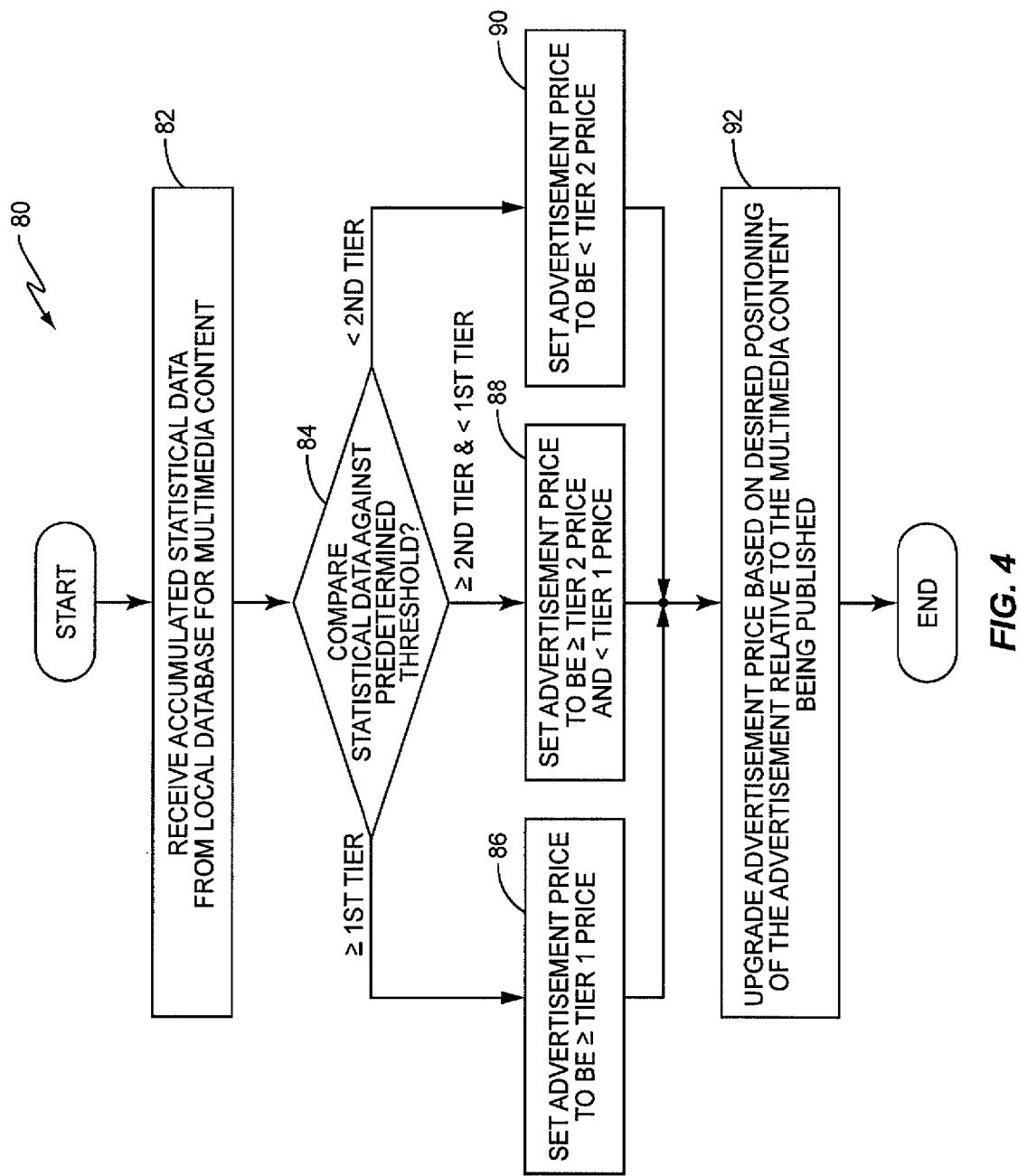
FIG. 4 is a flow diagram illustrating how the prices are dynamically generated based on the current popularity of the multimedia content according to various embodiments of the present invention.

FIG. 4 is a flow diagram illustrating a method 80 performed by the control server 44 of generating a price for an advertisement based on the current popularity of multimedia content. In this embodiment, the controller server 44 implements a "tiered" approach in which it compares the analyzed statistical data against a plurality of predetermined thresholds. Each threshold or tier is associated with a different price that is set by the publisher.

Method 80 begins with control server 44 retrieving and analyzing the accumulated statistical data stored the database 46 for a given multimedia content (e.g., an article) (box 82). It is assumed for the sake of illustration that the user terminals 12, 14 have previously provided the statistical data, and that the control server 44 has stored the statistical data in database 46. The control server 44 may analyze any desired type of statistical data, as well as analyze the accumulated statistical data in any manner known in the art. However, in this embodiment, control server 44 analyzes a total time that one or more users spent viewing the multimedia content and/or any comments that are associated with the multimedia content (box 84). That is, each user terminal 12, 14 reports a total time that the user spent viewing the received content. Upon receipt of the report, the control server 44 adds that user's time to the total times reported by other user terminals 12, 14 for the same content. The total time for all users is then used as an indicator of whether users generally spent more time, or less time, viewing that content as opposed to other content, and thus, how popular that content currently is with users. In other embodiments, control server 44 computes an average time that each user spent viewing the content and/or any associated comments.

As seen in FIG. 4, this embodiment utilizes a tiered approach to setting advertisement prices. Each price in each tier may be unique and determined by the publisher. If the total elapsed time for all users equals or exceeds a first predetermined threshold value (e.g., 1 hour), the control server 44 determines that the current popularity of the multimedia content is likely very high and sets the advertisement price to a first predetermined price. An advertiser that desires to have the publishing system publish an advertisement along with that multimedia content would be charged the first predetermined price (box 86). If the total elapsed time for all users equals or exceeds a second threshold value, but is less than the first threshold value (e.g., 21-59 minutes), the control server 44 could determine that the multimedia content is currently popular, but perhaps not as popular as other content, and thus, set the cost of placing an advertisement to a second predetermined price (box 88). Similarly, if the total elapsed time is less than the second threshold value (e.g., 20 minutes or less), the control server 44 might determine that the multimedia content is currently not very popular with users, and would set the cost of placing an advertisement to a third predetermined price (box 90). In at least one embodiment, the third predetermined price is a fixed price. It represents the lowest price that an advertiser would have to pay to place an advertisement along with multimedia content having a total elapsed time that is less than the second threshold value. This price may be set, for example, for multimedia content that is not currently popular with users.

The generated price can then, in some embodiments, be upgraded based on the desired placement of the advertisement relative to the beginning or the article (box 92). For example, in some cases, articles could span multiple pages. Those advertisements placed nearest the beginning of the article may have a better chance of being viewed by a user than would those advertisements placed near the bottom of the last page (which may not be seen by the user unless the user scrolls to the last page). Therefore, advertisements that appear closest to the beginning of the article (or closest to the top on the first page of an article) could be subject to a premium that is added onto the generated pricing cost.

It should be noted that the description of FIG. 4 describes generating a price within the context of the multimedia content being an article. However, this is for illustrative purposes only. The method 80 of FIG. 4 may also be used to determine prices for placing adverts in application programs. For example, in cases where the multimedia content is a game application (or other software program) that executes on user terminal 12, the method 80 could compare the total elapsed time that the users spent executing the application (e.g., playing the game on the user terminal 12) to determine the current popularity of the application. The cost of placing an advert in the application could then be set as previously described.

Figure 5:
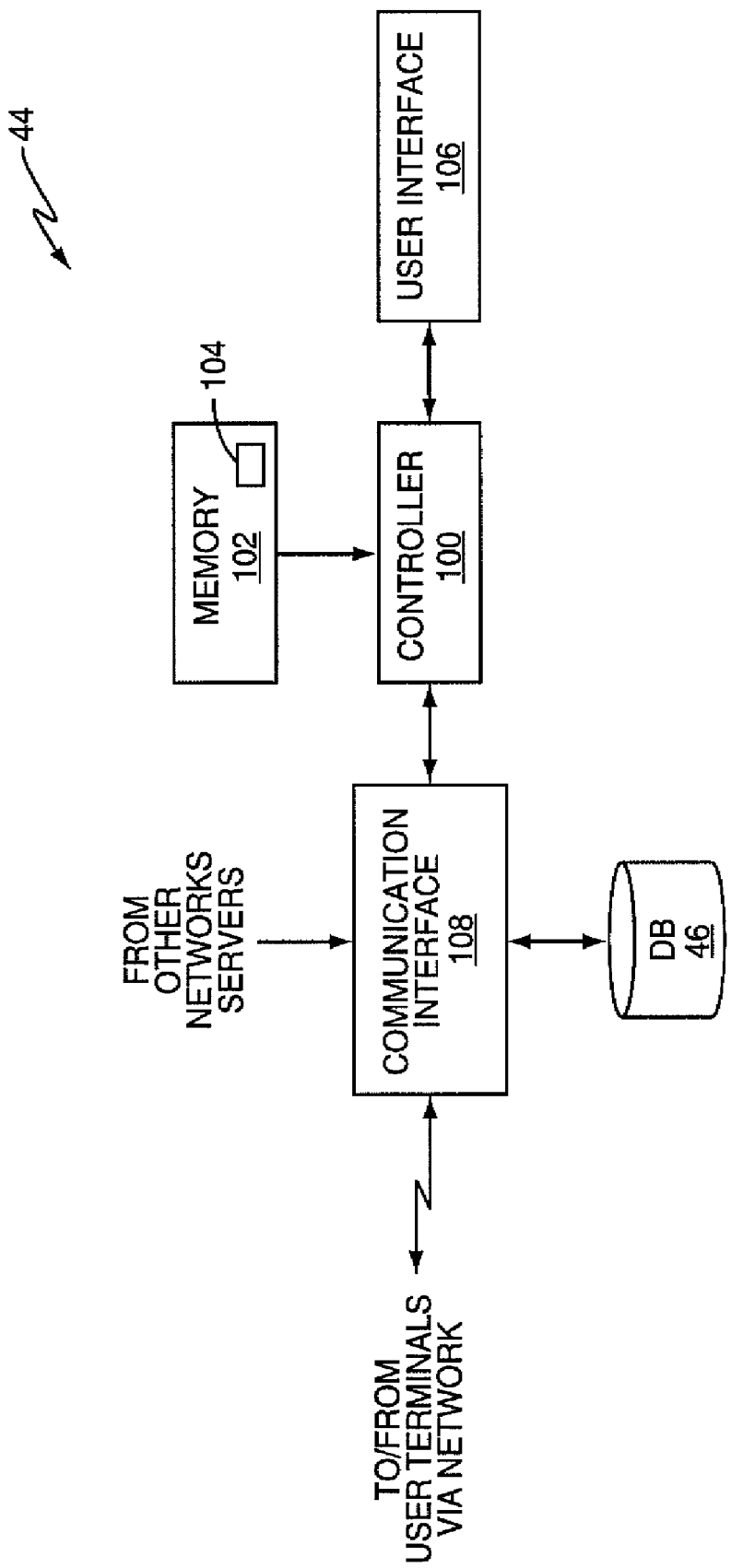
FIG. 5 is a block diagram illustrating some of the components of a computing device configured to determine the current popularity of a variety of different multimedia content, and to dynamically generate the prices for a variety of different advertisements based on those determinations.

FIG. 5 is a block diagram illustrating some of the components of a control server 44 configured according to one embodiment of the present invention. As seen in FIG. 5, the control server 44 comprises a controller 100, memory 102 to store an application program 104, a user interface 106, and one or more communication interfaces 108. Controller 100 may comprise, for example, one or more general purpose or special purpose programmable microprocessors that control the operation and functions of the control server 44 in accordance with the instructions and data (e.g., program 44). In one embodiment, the controller 100 executes the application program 104 to store the received statistical information in database 46, and to retrieve the data from database 46. The controller 100 then performs an analysis on the accumulated statistical data, in accordance with the application program 104, to determine the current popularity of the given multimedia content. Once determined, the controller 44 can generate a price to charge an advertiser, as well as generate one or more control signals to the content servers 42 to publish the advertisement along with the multimedia content.

Memory 102 represents the entire hierarchy of memory in the control server 44, and may include both random access memory (RAM) and read-only memory (ROM). As previously described, memory 102 stores the program instructions and data required for controlling the operation and functionality of control server 44. The user interface 106 enables a user to exchange information with control server 44 and includes devices and controls that facilitate such interaction, such as keyboards and displays. The communication interface 108 represents one or more fully functional interfaces for transmitting signals to and receiving signals from the user terminals 12, 14 via BSS 22, the database 46, and from other network servers, such as the content servers 42. The control server 44 receives statistical data from the user terminals 12, 14 and/or the content servers 42 via the communication interface 108, and sends it to the database 46. Additionally, the control server 44 retrieves the accumulated statistical data from the database 46 via the communication interface 108.

Figure 6:
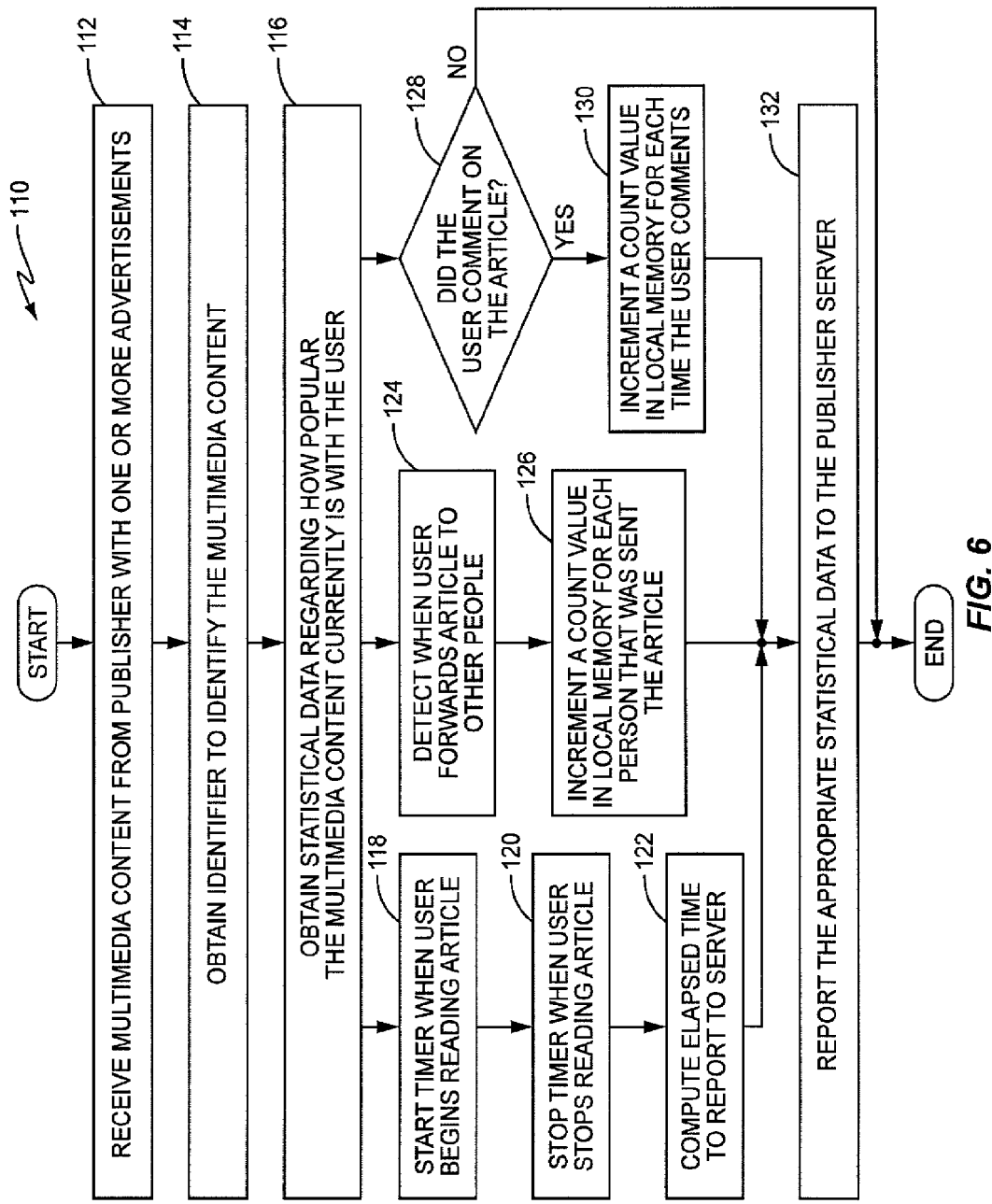
FIG. 6 is a flow diagram illustrating how a user terminal collects and reports the statistical data regarding the current popularity of the multimedia content to a network server.

FIG. 6 is a flow diagram illustrating how a user terminal, such as user terminal 12 and/or 14, collects and reports the statistical data to the control server 44. Method 110 begins when the user terminal receives the multimedia content from publishing system 40. Included with the content are one or more advertisements 50, as was seen previously in FIG. 2 (box 112). The user terminal could first determine a unique identifier, such as a title, for example, that identifies the particular content received by the user terminal (box 114). This identifier would be sent to the control server 44, along with the collected metrics, to allow the control server 44 to associate the reported data with the correct content. Then, the user terminal would collect the statistical data (box 116).

In one embodiment, for example, the user terminal might start a timer when the user opens and begins reading the content (box 118), and stop the timer when the user ceases reading the content (box 120). The user terminal could then determine an elapsed time for the user (box 122) and report that time back to the control server 44 for later analysis (box 132). In another embodiment, the user terminal might be configured to utilize other activity as an indication of how popular the received content currently is with the user. For example, the user terminal might detect when the user forwards or shares the article with one or more friends in an electronic message, for example, (box 124) and increment a counter according to the number of friends identified by the user (box 126). In at least one embodiment, the user terminal detects when the user comments on the received content (box 128), and increments a count value in local memory for each comment (box 130). In some embodiments, the user terminal may collect and report more than one of these metrics as an indicator of the current popularity of the received content. However, in each case, the user terminal collects one or more indicators that could indicate how popular the received content currently is with the user, quantifies that metric, and then reports the quantified metric to the control server 44 associated with the publisher that published the content (box 132).

Figure 7:
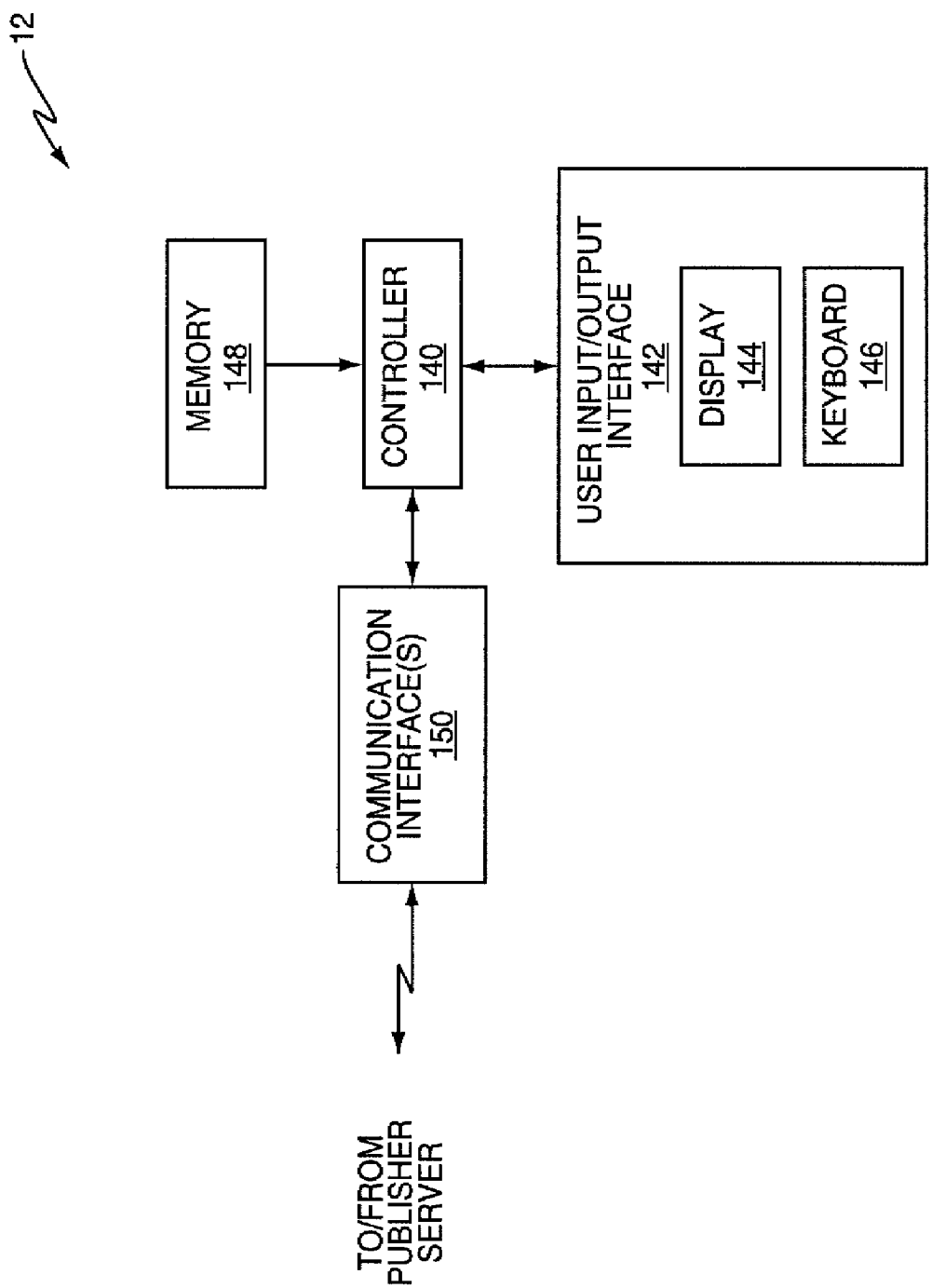
FIG. 7 is a block diagram illustrating some of the components of a user terminal configured to perform the functionality illustrated in FIG. 7.

FIG. 7 is a block diagram illustrating some of the components of a user terminal, such as user terminal 12, configured to report statistical data according to one embodiment of the present invention. As seen in FIG. 7, the user terminal 12 comprises a controller 140, a user interface 142 including a display 144 and a keyboard 146, memory 148, and a communications interface 150. Controller 140 may be, for example, one or more general purpose or special purpose microprocessors that control the operation and functions of the user terminal 12 in accordance with program instructions and data stored in memory 148. In one embodiment of the present invention, the controller 140 executes an application program to request and receive multimedia content from ePublishing system 40, and collect information that identifies that content. Controller 140 also executes the application program to collect statistical data indicating the current popularity of the received content with the user, and to report that information back to the control server 44.

The user interface 142 enables a user to exchange information with the user terminal 12 and includes devices and controls that facilitate such interaction. Typically, the user interface 142 includes a display 144 (e.g., an LCD or touch-sensitive display) that allows the user to view multimedia content received from the ePublishing system 40, and a keypad to allow the user to enter digits and other alpha-numeric input. Although not specifically shown, the user interface 142 could also include a microphone and a speaker to allow the user to communicate with one or more remote parties as is known in the art.

Memory 148 represents the entire hierarchy of memory in user terminal 12, and may include both random access memory (RAM) and read-only memory (ROM). Memory 148 stores the program instructions and data required for controlling the operation and functionality of the user terminal 12. In one embodiment of the present invention, memory 148 stores the instructions and data required by controller 140 for identifying the received multimedia content, and for collecting the statistical data regarding how popular the multimedia content currently is with the user. The memory also stores the instructions needed to upload or report that information to the control server 44.

The user terminal 12 also includes a communication interface 150 that may be, for example, a fully functional cellular radio transceiver for transmitting signals to and receiving signals from BSS 22 or other access node in a wireless communications network 20. With this interface, user terminal 12 can receive the multimedia content from the content servers as well as send the information to the ePublishing system 40. Those skilled in the art will appreciate that cellular transceiver 20 may implement any one of a variety of communication standards including, but not limited to, the standards known as the Global System for Mobile Communications (GSM), General Packet Radio Service (GPRS), Universal Mobile Telecommunication System (UMTS), TIA/EIA-136, cdmaOne (IS-95B), cdma2000, and Wideband CDMA (W-CDMA).

The user terminal 12 can also communicate this information to the control server 44 via a router and the Internet 30. Where user terminal 12 communicates with the control server 44 via the Internet 30 directly, the communication interface 150 would comprise a short-range transceiver, such as a BLUETOOTH transceiver, for example, that allows the user terminal 12 to connect to the Internet 30 via the wireless router 16.

The present invention may, of course, be carried out in other ways than those specifically set forth herein without departing from essential characteristics of the invention. For example, in the previous embodiments, the price is generated and charged to an advertiser at the time the advertisement is sent to the requesting user terminal along with the requested multimedia content. However, in another embodiment, the generated price could represent a minimum bid for the advertisers.

By way of example, the control server 44 could categorize the multimedia content according to topic. Articles dealing with the war on terror or a specific athlete might be considerably more popular with the public than articles on other topics. The control server 44 could then analyze the statistical data for the content to determine which type of content or topics are currently most popular, and dynamically generate a price as previously described. However, rather than be a fixed price to charge an advertiser, the generated value could be a minimum bid for the advertisers. Since publishers generally know which articles will be published, they could make that information known to the advertisers in advance. Starting at the minimum bid, the advertisers could then bid to have their articles published along with the most popular types of articles in the future (e.g., articles relating to the war on terror or a specific athlete).

Additionally, the previous embodiments describe the control server 44 as the entity generating the current popularity rating based on an analysis of raw statistical data being reported by the individual user terminals 12. However, in another embodiment, the user terminals 12 are configured to determine the current popularity of the multimedia content and report the rated popularity to the control server 44.

For example, in this embodiment, each user terminal 12 would have access to the same popularity determination algorithm as each of the other user terminals 12. When the user accesses an article or begins executing an application program, for example, the controller 140 of user terminal 12 might start a timer to measure the elapsed time. The controller 140 may also monitor whether the user provides comments or shares the content with other users. When the user is finished, the controller 140 of user terminal 12 would determine a popularity rating for the user.

By way of example, the user terminal 12 may employ the tiered approach described in FIG. 4 and assign a popularity rating based on the determined tier. Each tier may be unique and determined by the publisher, and has an associated popularity rating value. If the total elapsed time for the user equals or exceeds the first predetermined threshold value, controller 140 of user terminal 12 assigns a first popularity value to the content. If the total elapsed time for the user equals or exceeds a second threshold value, but is less than the first threshold value, the controller 140 might assign a second popularity rating value to the content. If the total elapsed time is less than the second threshold value, controller 140 might could assign a third popularity rating value, which may be a fixed price, to the content. Once assigned, the controller 140 could communicate the popularity rating value for the user to the control server 44. The server 44 could then analyze the popularity rating values for all users and determine a price for the content as previously described.

Therefore, the present embodiments are to be considered in all respects as illustrative and not restrictive, and all changes coming within the meaning and equivalency range of the appended claims are intended to be embraced therein.

What is claimed is:

1. A method for dynamically pricing an electronic advertisement that is displayed on one or more user terminals, the method comprising:
    receiving, from one or more user terminals:
        information identifying multimedia content being displayed on the user terminals; and
        statistical data indicating whether one or more users electronically shared the multimedia content with other users; and
    dynamically generating a price to charge an advertiser for publishing an electronic advertisement to the user terminals along with the multimedia content based on a current popularity of the multimedia content as indicated by the statistical data.

2. The method of claim 1 wherein the statistical data received from the one or more user terminals comprises a total time that each user spent viewing the multimedia content and/or comments associated with the multimedia content on their respective user terminal.

3. The method of claim 1 wherein the statistical data further indicates the number of other users with whom the multimedia content was electronically shared.

4. The method of claim 1 wherein the statistical data received from the one or more user terminals indicates whether one or more of the users posted a comment regarding the multimedia content.

5. The method of claim 1 further comprising accumulating the statistical data received from the one or more user terminals in a database.

6. The method of claim 5 wherein dynamically generating a price to charge an advertiser comprises:
    periodically analyzing the accumulated statistical data; and
    determining how popular the multimedia content currently is with a plurality of users based on the analysis of the accumulated statistical data.

7. The method of claim 6 wherein determining how popular the multimedia content currently is with a plurality of users comprises comparing the accumulated statistical data to one or more predetermined threshold values set by a publisher of the multimedia content.

8. The method of claim 1 wherein the dynamically generated price comprises a minimum bid.

9. The method of claim 1 wherein dynamically generating a price to charge an advertiser comprises dynamically generating the price based on the current popularity of the multimedia content and on a desired placement of the advertisement relative to the multimedia content.

10. A computing device configured to generate pricing information for an electronic advertisement that is displayed on one or more user terminals, the device comprising:
    a communication interface configured to receive, from one or more user terminals:
        information identifying multimedia content being displayed on the user terminals; and
        statistical data indicating whether one or more users electronically shared the multimedia content with other users; and
    a programmable controller configured to dynamically generate a price to charge an advertiser for publishing an electronic advertisement to the user terminals along with the multimedia content based on a current popularity of the multimedia content as indicated by the statistical data.

11. The computing device of claim 10 wherein the statistical data received from the one or more user terminals comprises a total time that the users spent viewing the multimedia content on their respective user terminal.

12. The computing device of claim 10 wherein the statistical data further indicates the number of other users with whom the multimedia content was shared.

13. The computing device of claim 10 wherein the statistical data received from the one or more user terminals indicates whether one or more of the users posted a comment regarding the multimedia content.

14. The computing device of claim 10 wherein the programmable controller is further configured to update a database to accumulate the statistical data received from the one or more user terminals.

15. The computing device of claim 14 wherein the programmable controller is further configured to:
    periodically analyze the accumulated statistical data; and
    determine the current popularity of the multimedia content based on the analysis of the accumulated statistical data.

16. The computing device of claim 15 wherein the programmable controller is further configured to compare the accumulated statistical data to one or more predetermined threshold values set by a publisher of the multimedia content to determine the current popularity of the multimedia content.

17. The computing device of claim 10 wherein the dynamically generated price comprises a minimum bid.

18. The computing device of claim 10 wherein the programmable controller is further configured to dynamically generate the price for the advertisement based on the current popularity of the multimedia content and on a desired placement of the advertisement relative to the multimedia content.

* * * * *